US011923648B2

(12) United States Patent
Barrett et al.

(10) Patent No.: US 11,923,648 B2
(45) Date of Patent: Mar. 5, 2024

(54) ELECTRICAL COMPONENT OF A SUBSEA CONNECTOR AND METHOD OF MANUFACTURE THEREFORE

(71) Applicant: Siemens Energy Global GmbH & Co. KG, Bayern (DE)

(72) Inventors: Wesley Barrett, Kendal (GB); Alan Crichton, Dalton-In-Furness (GB); Steven Fitton, Ulverston (GB)

(73) Assignee: Siemens Energy Global GmbH &Co. KG, Bayern (DE)

( * ) Notice: Subject to any disclaimer, the term of this patent is extended or adjusted under 35 U.S.C. 154(b) by 271 days.

(21) Appl. No.: 17/290,756

(22) PCT Filed: Nov. 6, 2019

(86) PCT No.: PCT/EP2019/080426

§ 371 (c)(1),
(2) Date: May 1, 2021

(87) PCT Pub. No.: WO2020/094730

PCT Pub. Date: May 14, 2020

(65) Prior Publication Data

US 2022/0006252 A1 Jan. 6, 2022

(30) Foreign Application Priority Data

Nov. 9, 2018 (GB) ...................................... 1818264
Feb. 27, 2019 (GB) ...................................... 1902632

(51) Int. Cl.
*H01R 43/24* (2006.01)
*E21B 33/038* (2006.01)
(Continued)

(52) U.S. Cl.
CPC ......... *H01R 43/24* (2013.01); *E21B 33/0385* (2013.01); *H01R 13/03* (2013.01);
(Continued)

(58) Field of Classification Search
CPC .... H01R 43/24; H01R 13/03; H01R 13/6581; H01R 43/005; H01R 13/02; H01R 13/035;
(Continued)

(56) References Cited

U.S. PATENT DOCUMENTS 2,873,482 A * 2/1959 Bridge ..................... H01R 4/52
264/235
3,951,499 A * 4/1976 Ploeger .................. H01R 33/46
439/671
(Continued)

FOREIGN PATENT DOCUMENTS

EP 2854247 A1 * 4/2015 ........... H01B 13/062
EP 2854247 A1 4/2015
(Continued)

OTHER PUBLICATIONS

International search report and written opinion dated Feb. 7, 2020 for corresponding PCT/EP2019/080426.

*Primary Examiner* — Abdullah A Riyami
*Assistant Examiner* — Justin M Kratt
(74) *Attorney, Agent, or Firm* — Wolter Van Dyke Davis, PLLC

(57) ABSTRACT

A component of a subsea connector includes a conductor, an electrically insulating layer and an at least partially electrically conductive layer. A method of assembling the component includes providing the insulating layer radially outward of the conductor; and applying the at least partially conductive layer onto the insulating layer by casting, moulding, compression fitting, or additive manufacturing techniques.

21 Claims, 9 Drawing Sheets

(51) Int. Cl.

| | |
|---|---|
| ***H01R 13/03*** | (2006.01) |
| ***H01R 13/6581*** | (2011.01) |
| ***H01R 43/00*** | (2006.01) |
| *H01R 13/02* | (2006.01) |
| *H01R 13/50* | (2006.01) |
| *H01R 13/52* | (2006.01) |
| *H01R 13/523* | (2006.01) |
| *H01R 13/6599* | (2011.01) |
| *H01R 43/20* | (2006.01) |

(52) U.S. Cl.
CPC ....... *H01R 13/6581* (2013.01); *H01R 43/005* (2013.01); *H01R 13/02* (2013.01); *H01R 13/035* (2013.01); *H01R 13/50* (2013.01); *H01R 13/52* (2013.01); *H01R 13/5219* (2013.01); *H01R 13/523* (2013.01); *H01R 13/6599* (2013.01); *H01R 43/20* (2013.01)

(58) Field of Classification Search
CPC .... H01R 13/50; H01R 13/52; H01R 13/5219; H01R 13/523; H01R 13/6599; H01R 43/20; E21B 33/0385
See application file for complete search history.

(56) References Cited

U.S. PATENT DOCUMENTS

| | | | | |
|---|---|---|---|---|
| 2008/0020611 A1* | 1/2008 | Marklove | ............ | H01R 13/648 439/190 |
| 2015/0184764 A1* | 7/2015 | Diehl | ...................... | F16K 11/20 137/240 |
| 2016/0156126 A1 | 6/2016 | Eliassen | | |
| 2017/0201039 A1* | 7/2017 | Jenkin | .................. | H01R 13/523 |
| 2019/0165559 A1 | 5/2019 | Iversen et al. | | |

FOREIGN PATENT DOCUMENTS

| | | | | |
|---|---|---|---|---|
| GB | 2434698 A | 8/2007 | | |
| GB | 2440183 A | 1/2008 | | |
| WO | WO-2011106934 A1 * | 9/2011 | ........... | G02B 6/4441 |
| WO | 2017133950 A1 | 8/2017 | | |

* cited by examiner

FIG 14B
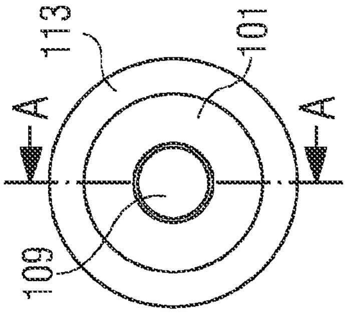
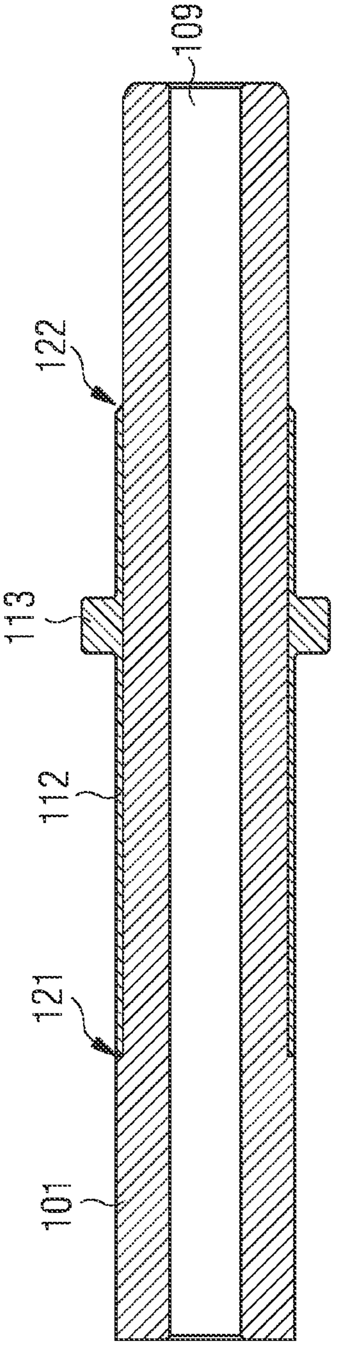
FIG 14A
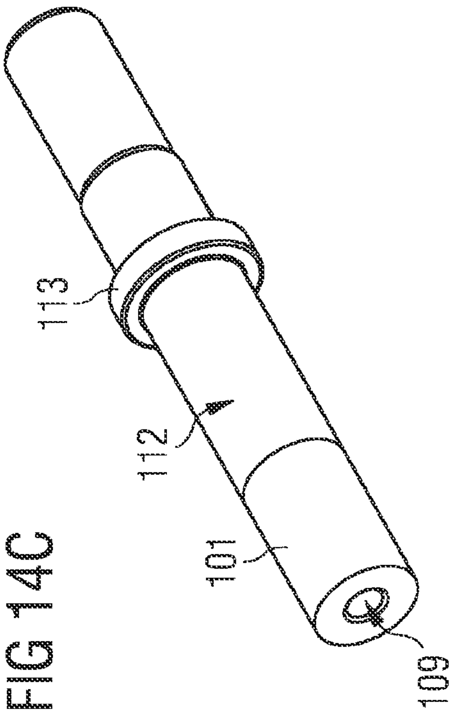
FIG 14C

ELECTRICAL COMPONENT OF A SUBSEA CONNECTOR AND METHOD OF MANUFACTURE THEREFORE

CROSS REFERENCE TO RELATED APPLICATIONS

This application is the US National Stage of International Application No. PCT/EP2019/080426 filed 6 Nov. 2019, and claims the benefit thereof. The International Application claims the benefit of United Kingdom Application No. GB 1818264.2 filed 9 Nov 2018 and United Kingdom Application No. GB 1902632.7 filed 27 Feb. 2019. All of the applications are incorporated by reference herein in their entirety.

FIELD OF INVENTION

This invention relates to a component of a subsea, or underwater, connector and a method of manufacturing the component.

BACKGROUND OF INVENTION

In subsea applications, users of connectors for underwater or subsea use are particularly concerned about reliability because of the cost and difficulties in accessing and repairing failed equipment subsea. There are also cost pressures on the manufacturing process, so improvements are desirable.

SUMMARY OF INVENTION

In accordance with a first aspect of the present invention, a method of assembling a component of a subsea connector, the component comprising a conductor, an electrically insulating layer and an at least partially electrically conductive layer; the method comprising providing the insulating layer radially outward of the conductor; and applying the at least partially conductive layer onto the insulating layer by casting, moulding, compression fitting, or additive manufacturing techniques.

Compression fitting typically comprises providing compression at an interface between two layers resulting in intimate contact between the two layers. The compression fitting may be achieved by moulding of the electrically insulating layer or the at least partially electrically conductive layer.

The step of providing the insulating layer may comprise applying the insulating layer to the conductor by casting, moulding, compression fitting, or additive manufacturing techniques, or by forming the insulating layer as an insulation sleeve and assembling the conductor into the insulation sleeve.

The method may further comprise, before applying the insulating layer, machining the surface of the conductor to form a first predetermined profile.

The method may further comprise, before applying the insulating layer, applying a semi-conductive layer by casting, moulding, compression fitting, or additive manufacturing techniques.

The method may further comprise, before applying the at least partially conductive layer, machining the surface of the insulating layer to form a second predetermined profile.

The method may further comprise machining the at least partially conductive layer to a third predetermined profile.

The machining of the at least partially conductive layer may include removing specific areas of the at least partially conductive layer to expose the insulating layer again.

The casting or moulding of the at least partially conductive layer may be carried out under a pressure that is greater than atmospheric pressure.

The method may further comprise applying a metal layer to the at least partially conductive layer on a surface of the at least partially conductive layer remote from the conductor, or applying a metal layer to a surface of the insulating layer remote from the conductor.

The metal layer is located coaxial with, and radially outwardly of, the conductor and may be arranged to cover only part of the at least partially conductive layer.

The at least partially conductive layer may comprise a semi-conductive layer, applied to one or more discrete regions of the insulating layer, or applied over substantially all of the insulating layer around the conductor.

The at least partially conductive layer may comprise a metal layer, in particular a highly corrosion resistant metal alloy, suitable for subsea applications, such as a stainless steel, stainless nickel alloy, titanium, or titanium vanadium alloy.

The metal layer may be applied by any suitable compression fitting method, such as shrink fitting, or press fitting.

A compression fitted metal layer has the advantage that it protects the insulating layer and/or the at least partially conductive layer, from seawater, reducing the likelihood of degradation over time, which is a particular issue for high voltage products.

In accordance with a second aspect of the present invention, a component of a subsea connector comprises a conductor, an electrically insulating layer and a printed, cast, compression fitted, or moulded at least partially electrically conductive layer applied to the electrically insulating layer.

The at least partially electrically conductive layer may comprise an electrically conductive semi-crystalline thermoplastic; an electrically conductive polymer, an electrically conductive rubber, a metal alloy, or an electrically conductive epoxy.

If the at least partially conductive layer comprises a metal alloy, the metal alloy is typically a highly corrosion resistant metal alloy, suitable for subsea applications, such as a stainless steel, stainless nickel alloy, titanium, or titanium vanadium alloy.

The at least partially electrically conductive layer may comprise one of a compound of polyaryletherketone, with carbon; or room temperature vulcanisable rubber with a carbon additive, or nickel, or a compound of polyolefin with carbon.

The compound may comprise polyetheretherketone with carbon, or polypropelene with carbon.

The component may further comprise an electrically semi-conductive, or at least partially electrically conductive, layer between the conductor and the electrically insulating layer.

This allows a different geometry to be added by moulding the at least partially conducting layer, for example the outer surface of the conductor may have an irregular shape with steps for mechanical keying and the additional partially electrically conductive layer, then smooths those steps off before the insulating layer is applied The electrically insulating layer may comprise a polymer or thermoplastic.

The electrically semi-conductive layer may comprise a polymer or thermoplastic to which a weakly electrically conducting additive has been applied.

The electrically semi-conductive layer may comprise an electrically conductive semi-crystalline thermoplastic; an electrically conductive polymer, an electrically conductive rubber, or an electrically conductive epoxy, in particular, one of a compound of polyaryletherketone with carbon, in particular polyetheretherketone with carbon; or room temperature vulcanisable rubber in a compound with carbon, or nickel; or polyolefin in a compound with carbon, in particular, polypropelene with carbon.

If the at least partially conductive layer is not a metal alloy, then the component may further comprise a metal layer outside the at least partially conductive layer.

The metal layer may comprise a highly corrosion resistant metal alloy, suitable for subsea applications, such as a stainless steel, stainless nickel alloy, titanium, or titanium vanadium alloy.

A component comprising a conductor, an insulating layer radially outward of the conductor, a semi-conductive layer and a metal layer radially outward of the insulating layer is particularly applicable for high voltage power conductor connectors. The semi-conductive layer is optional for lower voltage connectors, where the electrical stresses are not sufficient to require the additional electric field control that this layer provides.

BRIEF DESCRIPTION OF THE DRAWINGS

An example of a subsea component assembly and associated method of manufacture in accordance with the present invention will now be described with reference to the accompanying drawings in which:

FIGS. 14*a* to 14*c* illustrate more detail of another embodiment of the present invention; and, FIG. 15 is a flow diagram of a method of manufacturing a component of a subsea connector, according to another aspect of the invention.

DETAILED DESCRIPTION OF INVENTION

As previously discussed, subsea, or underwater, components need to be particularly reliable, but increasing cost pressures make it desirable to be able to manufacture such components more efficiently and to reduce the risk of failure in use. Subsea connectors typically comprise a plug, including a socket and a receptacle, including a pin. Within the connector, pins typically comprise a conductor with an insulating layer. For example, there may be a receptacle pin, a socket contact, or a penetrator pin. The examples given herein relate to a socket contact and a receptacle pin, but the invention is not limited to these examples. Conventionally, the contact, or pin, has been manufactured in a multi-stage process whereby a conductor core is machined to a desired shape, an insulating layer of non-conductive material is applied over the conductor core and then a conductive layer is applied onto the non-conductive material, either by painting, coating using an autocatalytic process, or press fitting the conductive layer onto the insulating layer. The application of the final conductive layer may have to be undertaken off site at special facilities, adding costs and delay and may not result in an effective interface between the layers. An alternative of using a glued in metal boss to provide the outer conductor involves an additional type of manufacturing step, as well as inspection steps, adding time and cost. The method of the present invention addresses these issues.

Figure 1:
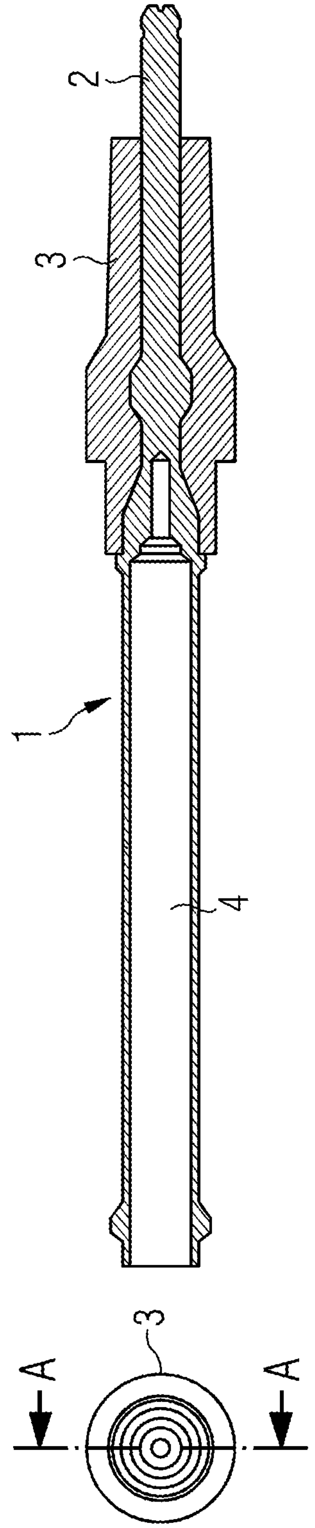
FIG. 1 illustrates a first stage of manufacturing an example of a component according to the present invention.
Figure 2:
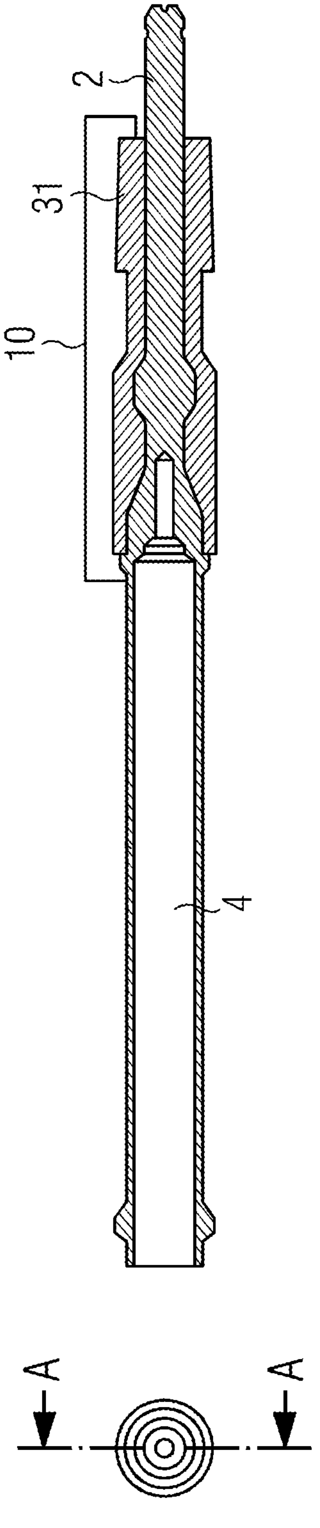
FIG. 2 illustrates a second stage of manufacturing an example of a component according to the present invention.

An example of a method of manufacturing a subsea component and pin according to the present invention is illustrated in FIGS. 1 to 4. The component 1 comprises a conductor 2, onto which an electrically insulating layer 3 has been applied as shown in FIG. 1. The component also includes a socket contact (conductor) 4. For a power connector, the conductor 2 may be a copper conductor, of a suitable size for carrying high voltage. The socket contact part 4 of the conductor 2 of a receptacle may have been machined to a suitable form from a metal rod before being selected and the insulating layer 3 applied to the outer surface of the conductor 2, or else the machining to the desired shape may be carried out as part of the assembly process. The conductor 2 may comprise a load shoulder to retain the insulating layer under load and smooth out the electrical field. The insulating layer 3 may be made, for example, by injection moulding directly onto the machined surface, or have been manufactured in other ways in advance, for example by machining and then be assembled before applying the insulating layer to the conductor 2. Typically, the insulating layer material is chosen to be dimensionally stable, suitable for high or low temperature applications, have low water absorption properties and be chemically resistant, or compatible, so inert in contact with the conductor. Examples of suitable insulating materials from which the insulating layer may be made include Polyaryletherketones (PAEK), including polyetheretherketone (PEEK), but more generally, any formable non-conducting material, such as polymers or thermoplastics may be used. The insulating layer may then be machined back to a desired surface profile, as illustrated in FIG. 2, where part of the insulating layer has been removed to leave the profiled surface 31. If required, other preparatory steps may be carried out at this point.

Figure 3:
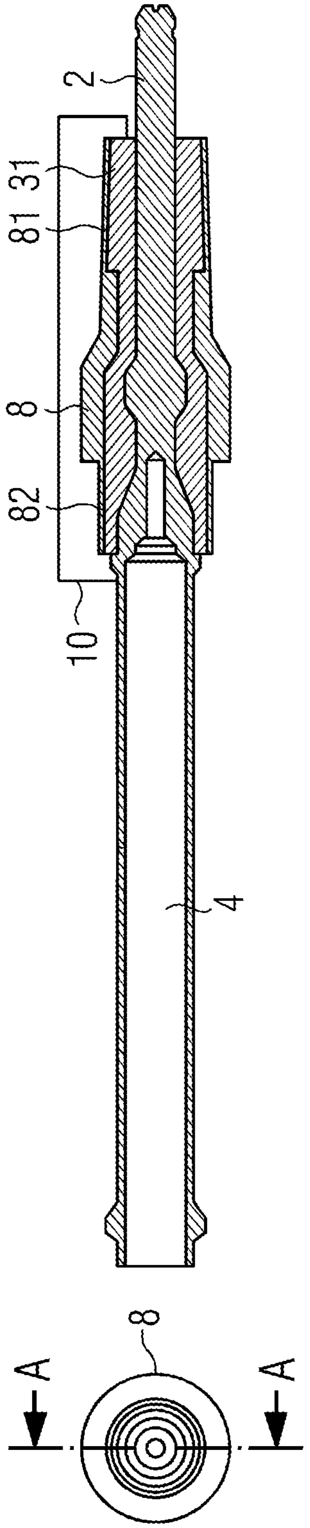
FIG. 3 illustrates a third stage of manufacturing an example of a component according to the present invention.

FIG. 3 shows the step of applying a layer which is at least partially conductive, or semi-conductive, referred to hereinafter as the conductive layer 8. The conductive layer 8 has been applied to the profiled surface 31 of the insulating layer. The conductive layer 8, in this example, extends over the entire insulating profile 31, the extensions being a relatively thin layer 81, 82 at the extremities of the insulating layer 31. When the conductive layer is applied in its molten form, it forms an intimate contact with the PEEK insulating layer. An effective intimate contact allows the assembly to be carried out without the need for application of a bonding agent.

The techniques by which the electrically conductive layer 8 are formed may include casting, moulding, compression fitting, or additive manufacturing, or 3-D printing. In casting, molten material, such as metal, is injected or poured into a mould, such that when the molten material hardens, it takes up the shape of the mould, forming a cast. The mould is then removed from the solid cast. Moulding involves shaping liquid, or a pliable raw material, by pouring the liquid or raw material into a hollow container, or mould, so that the molten material takes the shape of the mould when the material becomes solid. For the example shown, the casting or moulding may be of conductive polyetheretherketone, i.e. conductive PEEK, although polymers or thermoplastics, to which a conductive additive may be added, may be used, or other formable materials such as cold moulded epoxy, or room temperature vulcanisable rubber could be used, both with conductive additives. Rubber with a conductive additive has the advantage that the O-ring seals usually used in the slots 11 machined in the step illustrated in FIG. 4 could be replaced by suitably forming the rubber, so that the seals are an integral part of the outer conductive layer. This has the advantage that fewer parts are required in the receptacle and fewer steps overall in the assembly process.

Another technique is additive manufacturing, or 3-D printing, which involves making objects by applying layers of material one after the other and heating each layer so that it melts to bond with the layer that was laid down beforehand, or else retains sufficient heat to melt the next layer that is applied. The design may be modelled as a computer aided design model, then sliced so that each very thin layer, typically 30 to 50 microns thick, is laid down by a nozzle or print head at a precise location to generate the desired shape. Heating is typically applied by a laser or electron beam and the material is typically applied as a powder. The laser or electron beam melts the powder at the point where the beam is applied and as the melted powder cools again, it fuses with surrounding material, eventually forming the three-dimensional shape that was originally modelled. This avoids the need to manufacture a mould or die to obtain a moulded or cast shape. For the example given, for additive manufacturing, nickel may be sprayed on in its molten state, or carbon nano-tubes added to a base material, such as a polymer, to make the base material conductive.

Figure 4:
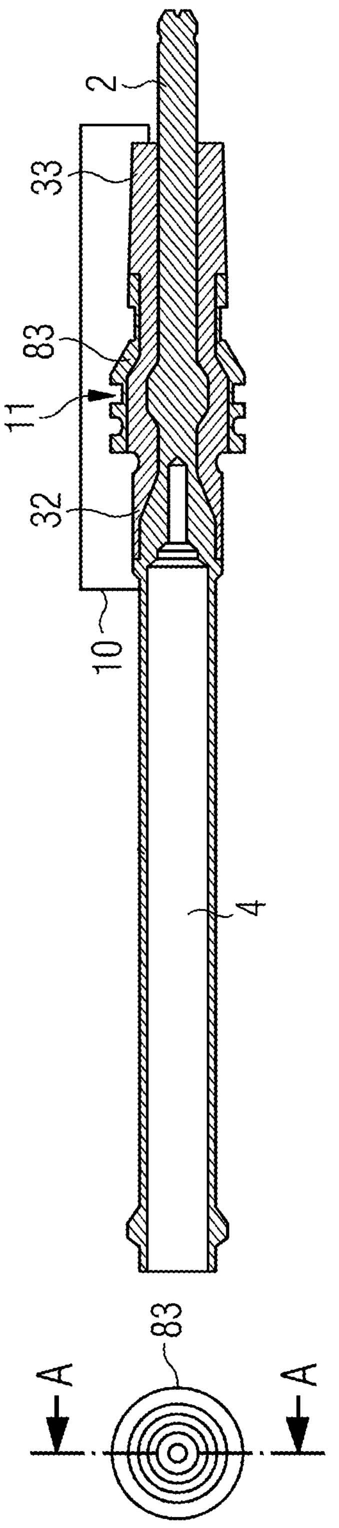
FIG. 4 illustrates a fourth stage of manufacturing an example of a component according to the present invention.

The conductive layer 8, whether formed by casting moulding or additive manufacturing, on the insulating layer 31 creates an intimate layer with the insulating material. The layer may be created under pressure, or without changing the pressure from that of the surroundings. Injecting under pressure has benefits, including, but not limited to producing a better fill, with fewer voids, improving the density of the layer, and enhancing its mechanical properties, such as strength, or hardness. Thereafter, the conductive layer 8 and insulative layer 31 may be machined to the desired final profile. For example, as can be seen in FIG. 4, the thin sections 81, 82 of the conductive layer may be removed to expose the insulating layer at that location and the insulating layer further modified 32, 33. The main body 8 of the conductive layer may be machined to a specific profile 83, for example, to address the requirements of electrical field control, the inner profile being dictated by the shape of the insulative layer 31. The requirement for locating other parts, such as O-Rings may influence the external profile.

Figure 5:
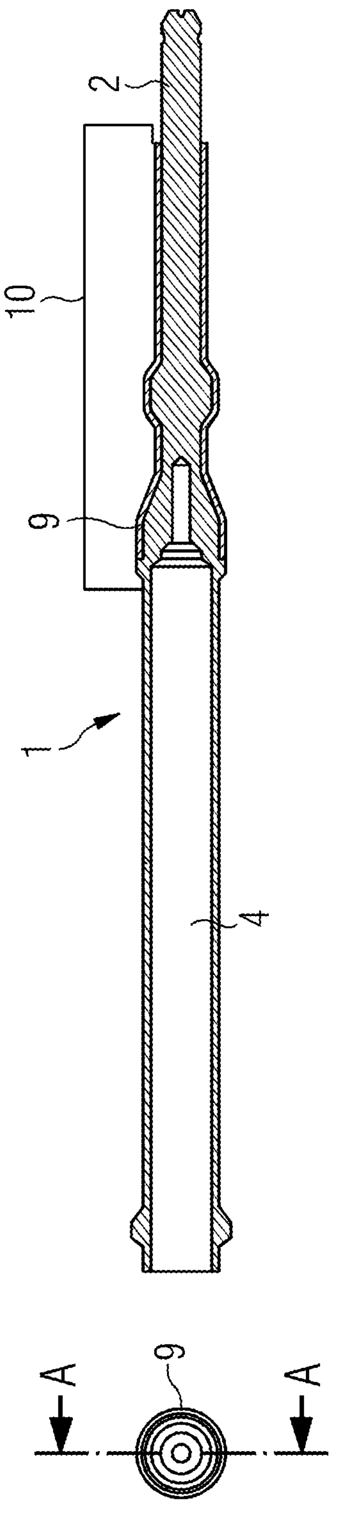
FIG. 5 illustrates an additional stage of manufacturing an example of a component according to the present invention; and, FIG. 6 is a flow diagram of a method of manufacturing a component of a subsea connector, according to an aspect of the invention.

A further application of the present invention is to provide an additional layer, at least partially conductive, or semi-conductive, hereinafter referred to as a semi-conductive layer, on the inside of the insulating layer, between the conductor and the insulator, in order to form a sleeve that acts as a shield for stray electric fields. The method described in FIGS. 1 to 4 may then be modified by adding a step before the step of FIG. 1, in which a semi-conductive layer is applied. This is illustrated in FIG. 5. The partially conducting layer, semi-conductive layer 9, is typically a polymer with a conducting additive, so that it acts as a weak electrical conductor, but is not entirely insulating as a polymer without the additive would be. The process by which the semi-conductive layer is applied is otherwise similar to the application of the conductive layer 8. In some cases, the same material may be used for both the conductive layer 8 and the semi-conductive layer 9, as both require that the material is at least partially conductive. The conductor surface is prepared and a mould 10 having a suitable profile is placed around the conductor. Molten material is supplied to the mould and then allowed to solidify before the mould is removed and the semi-conductive layer prepared for the insulating layer 3 to be added, as illustrated in FIG. 1. In some applications, for example, where stress control is required between the conductor and the insulative layer to improve the electrical performance, or reduce partial discharge (PD), then the method may be used for only the steps of FIGS. 5 and 1 to 3, but without the addition of the outer conductive layer. In other cases, all three layers, semi-conductive layer, insulating layer and conductive layer, are added to the conductor.

Figure 6:
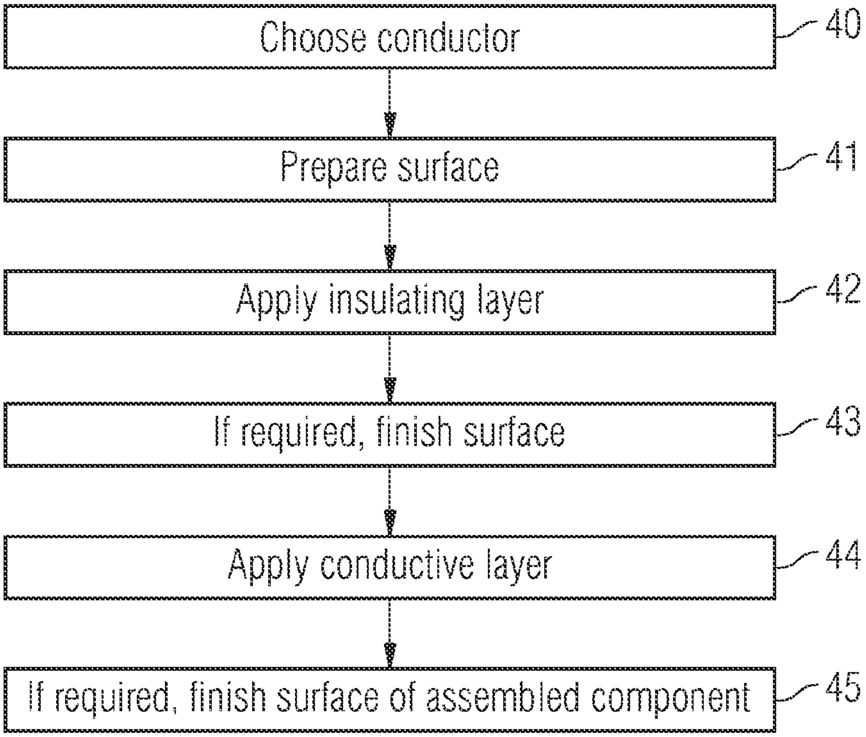

FIG. 6 is a flow diagram of an example of a method according to the present invention. A first step is to select 40 a conductor 2 and if required, prepare 41 the surface, for example by machining to a specific profile. If a semi-conductive layer is required, then this layer is applied to the conductor using whichever one of the techniques has been chosen, i.e. casting, moulding, or additive manufacturing. After machining the conductor, the insulating layer 42 is applied and if required, the surface is finished 43 to the required profile before applying 44 the conductive layer by one of casting, moulding, or additive manufacturing. This finishing step would not be required if the production volumes were large enough to have a specific mould tool for the first stage moulding. If required, the external surfaces of the insulating layer and conductive layer of the assembled component are then finished 45, for example by machining to the final required profile. Alternatively, the required profile is formed as part of a moulding step by which the conductive layer 8 is formed, for example by moulding an at least partially conductive elastomeric material over the insulating layer 3, moulded to size. The steps described may be automated and handing off between the layer application steps and the machining steps carried out by a robot arm between each station on a production line.

The use of casting, moulding or additive manufacturing techniques, produces a conductive layer which is intimately in contact with the insulating material onto which it is formed, which may be a complex shape. In the example of using a plastic injection moulding process with conductive PEEK onto a PEEK insulator, the conductive polymer layer is formed intimately onto the non-conductive base material. The method of the present invention allows complex shapes to be fully, or partially, overmoulded, easily machined to tight tolerances and when fully assembled, the thermal expansion of the conductive layer may be matched closely to the thermal expansion of the material on which it is formed, so that they move together as one. This improves reliability of the connector in operation.

In a second embodiment of the present invention, illustrated in the examples of FIGS. 7 to 15, a component 100 for a subsea, or underwater, connector comprises a metal layer 112 outside an insulating layer 101. Optionally, the insulative PEEK may be fully or partially sleeved by a conductive polymer (such as conductive PEEK), and then further over-sleeved by a metal layer or housing. FIGS. 12*a* to 12*c* illustrate a continuous layer of conductive polymer (also referred to as a partially conducting or semi-conductive layer). FIGS. 13*a* to 13*e* illustrate the use of discrete regions of semi-conductive material and FIGS. 14*a* to 14*c* illustrate an example without any semi-conductive layer. The metal layer protects the material of the insulating layer from exposure to sea water, so as to reduce the long-term degradation that may result from operating an electrical product underwater, in contact with seawater. Electrical stress at interfaces is dependent both on voltage of operation and geometry, so a thick insulator at a higher voltage may prevent partial discharge, where a thinner insulator at a lower voltage does not. Although there may be some benefit in terms of reducing degradation when operating above 1 kV, the protective effect of the metal layer is particularly beneficial at voltages above 3 kV. The specific examples illustrated herein are for a receptacle pin, but the process may equally be applied to a socket contact or penetrator pin.

FIGS. 7 to 11 illustrate an example of the second embodiment manufactured according to a method of the present invention. The illustration in FIGS. 7 to 14 is based on an axially symmetric conductor 109 having shaped ends 110, 111 which is assembled into an outer insulating layer or sleeve 101 which has previously been formed, for example by machining. However, the uniform conductor of FIG. 14*a* may equally well be used in these embodiments, or other variations in profile, without departing from the invention. If the optional semi-conductive layer is to be used, the semi-conductive layer 106 is applied to the outer surface of the insulation sleeve 101 and then the metal layer 112 layer is applied radially outward of the conductor and insulator. If an optional conductive layer (not shown) is to be used on the inner surface of the insulation sleeve 101, then this layer is applied before assembling the insulation sleeve 101 and conductor 109 together.

Figure 7:
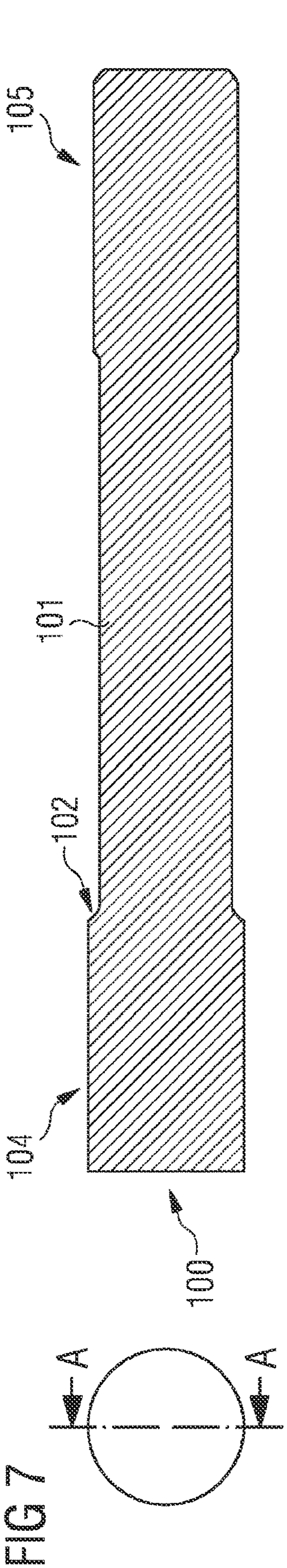
FIGS. 7 to 11 illustrate stages in the manufacture of a high voltage power conductor pin component according to an embodiment of the invention.
Figure 8:
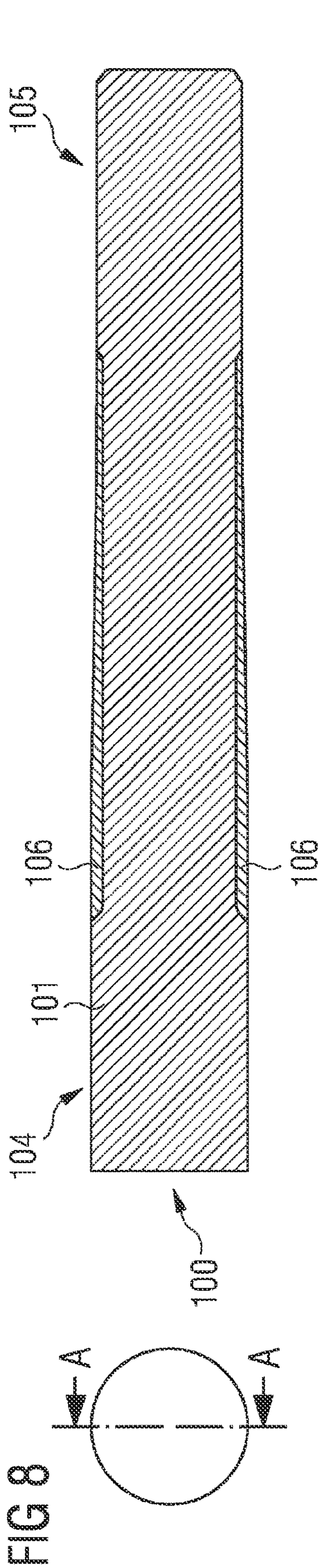

The insulation sleeve of these examples is typically formed by machining a hollow cylinder from a solid bar of insulating material, such as PEEK. The machining may take place at any stage in the steps illustrated by FIGS. 7 and 8 and before the steps of FIG. 9. FIG. 7 illustrates how the insulating layer 101 has further been machined on its outer surface, for example by radially machining away material along a section of the PEEK bar or cylinder, in order to provide a location for a layer of electrical stress control material 106, for example, a semi-conductive layer 106, such as conductive PEEK. The conductive PEEK is applied to the outer surface of the insulating layer in the prepared region. The electrically semi-conductive layer, shown in FIG. 8, is typically applied by over-moulding into the section of the insulating layer from which material has been material removed. In this particular example, the insulating sleeve has a shoulder 102 formed at one end and the outer diameter of the insulating layer 101 at one end is greater than the outer diameter at the other end. This allows the shape of the conductor ends 110, 111 to be accommodated. A different shape of conductor may result in a different outer profile of each layer.

As can be seen in FIG. 8, the layer 106 of electrical stress control material, typically a semi-conductive material such as conductive PEEK, is overmoulded into the section that can be seen in FIG. 7. The outer surface of this partially electrically conducting layer is moulded so that a continuous smooth surface is formed at the transition at the shoulder 102 of the outer layer of the insulating material 101 that has not been covered with semi-conductive material and the edge of the outer surface of the semi-conductive layer 106 where it starts to cover the prepared section of the insulating layer 101. The smooth physical transition ensures there is also electrical smoothing at the transition.

Figure 9:
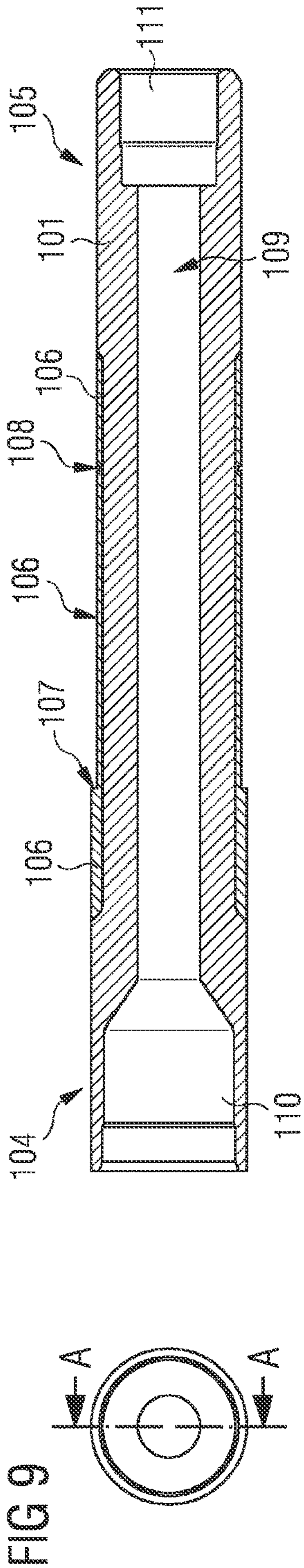

The next step in the manufacturing process is to insert the conductor 109 into the hollowed-out cylinder 101 and prepare that part of the electrically semi-conductive layer 106 onto which a metal layer will be applied. As with the preparation step of FIG. 7, this is typically carried out by machining. In this example, the machining forms a shoulder 107 at one end, as can be seen in FIG. 9. Optionally, the machining may also provide a groove 108 to locate a circlip. The circlip increases mechanical strength in the plug direction in extreme handling conditions. Another optional component which may be added at this stage is a seal 114, such as an O-ring seal, which can be seen in FIGS. 10 and 11. If a seal is to be used, this is fitted before the metal layer 112, 113 is applied. If required, a suitable filler may be provided between the conductor and the sleeve, when the conductor has been assembled into the insulating sleeve.

Figure 10:
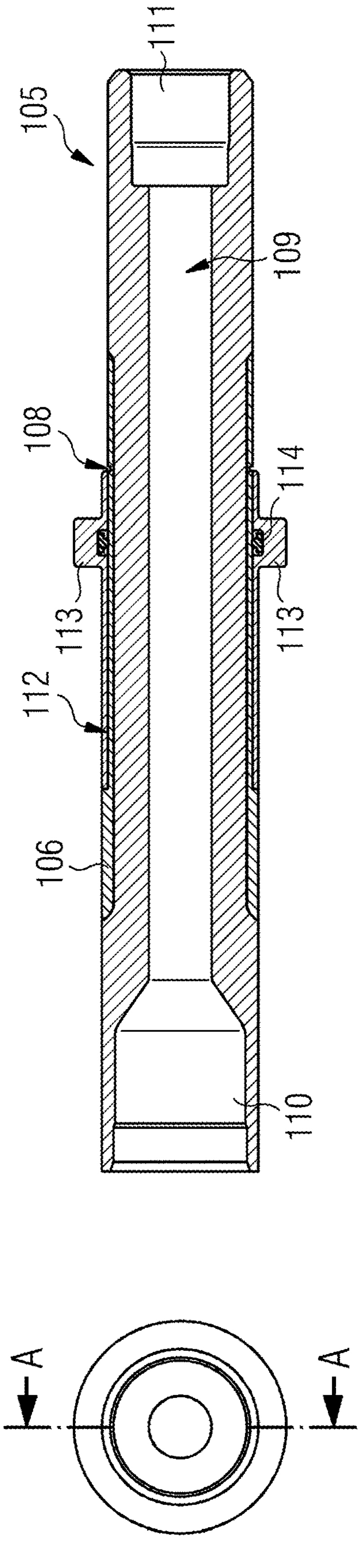
Figure 11:
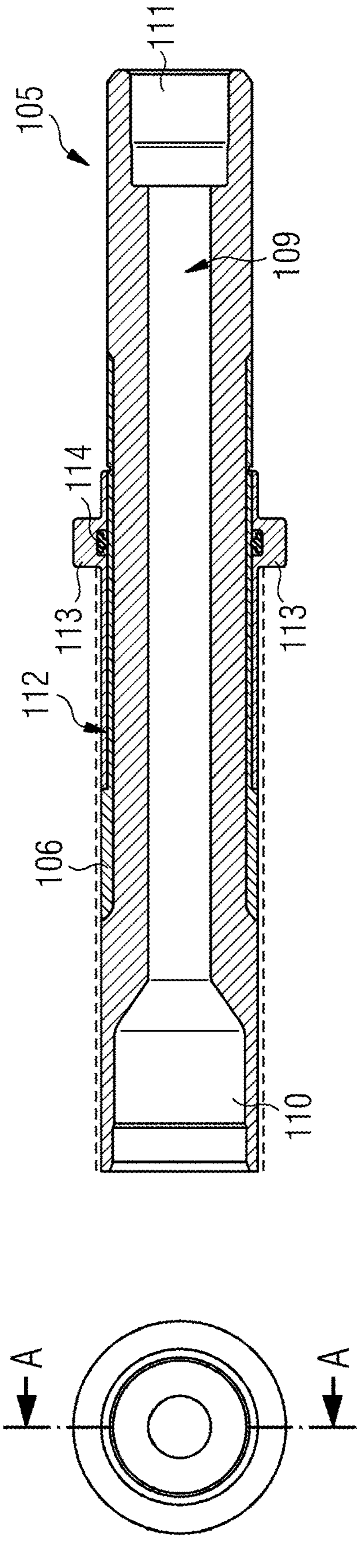

FIG. 10 shows the metal layer 112, 113, applied by compression fitting, such as by moulding, shrink fitting, or press fitting, the metal sleeve into the prepared section of the partially conducting layer 106. Compression fitting is applied by the national cooling of the material during the moulding process, with the end result that the material diameter is reduced and applies more pressure when cooler, than when warmer. Press fitting is when two parts are brought together and squeezed onto eachother. In either case, it is possible to have materials with the same nominal diameter.

In general it is more difficult to get changes in geometry with conventional techniques, such as heat shrinking a rubber sleeve, or other solid material which is provided at nearly the correct diameter to which heat is applied to shrink the material onto the layer below, or the material is expanded first then allowed to cool down and reduce again onto the layer below . By moulding a liquid material to the desired shape, then cooling that liquid, it will solidify with a compressive effect on the layer beneath, but also allow very specific geometry to be applied as required for the overall product, not just for the two surfaces that are in contact.

The metal layer typically comprises a highly corrosion resistant metal alloy, suitable for subsea applications, such as a stainless steel, stainless nickel alloy, titanium, or titanium vanadium alloy. Alternatively, a good conductor, such as copper, may be one of the layers. The process for compression fitting may comprise heating or cooling one or both of the components before assembling them, for example heating one and cooling the other, or heating one or cooling one and then fitting the two components together and allowing them to return to ambient temperature. The result of the process is to produce an interference fit due to a relative size change after assembly caused by thermal expansion or contraction. Using this technique has the advantage of increasing the mechanical strength by compression on the full surface of the conductive PEEK.

Applying two outer layers of moulded PEEK onto a copper conductor for example, using the compression fitting technique described, gives two hermetic seals. One between the conductor and the PEEK, the other between two layers, or diameters, of PEEK. All elements of the pin (conductor and conductive PEEK layers) for a subsea connector need to be solid. Heat shrinking techniques cannot achieve this. The metal conductor of the pin provides mechanical strength, the semi-conductive, or partially conductive layer, for example, conductive PEEK, formed by moulding to a suitable geometry, allows the electrical properties to be optimised by forming a shape or a smooth surface as required at specific locations along the pin. Each moulded layer may include specific form or features, for example to allow for mechanical interaction with other parts of the connector and to address the conflict between desirable mechanical properties, for example straight edges, which in electrical terms would be better as smooth curves. The number of layers of moulded PEEK required may vary, so if a single layer of conductive PEEK can reduce electrical stresses sufficiently, the second layer may not be required.

Compression fitting of a metal layer may be done by heating a metal sleeve to expand it and then allowing the metal to contract as it cools forming a compression fit on the layer below. In addition, the layer below, whether partially conducting, or an insulator, as described hereinafter, may be cooled down to allow the metal sleeve to be fitted onto the partially conducting layer or insulating layer. The layers may have the same nominal diameter, but by heating one to expand it and heating the other to cool it, then the outer metal layer can be fitted over the inner, partially conductive, or insulating layer. Cooling or heating of the layers, as appropriate brings them back to their nominal diameter with a compression fit. The very high compressive forces generated using this technique prevents air from being trapped between the two surfaces, which may otherwise have a detrimental effect on the electrical properties.

In the example of FIG. 10, the metal layer 112, 113 is compression fitted to the prepared section of the semi-conductive layer between the shoulder and the c-clip groove and covers the seal 114. Beyond this region, the semi-conductive layer 106, or insulating layer 101, is the outermost layer, rather than the metal layer 112, 113. A final step, applied to the mating side only of the pin, is to grind the three different outer layers to ensure a smooth and continuous parallel surface. This is necessary as this is a sealing surface which interfaces with elastomeric seals in the plug. These could otherwise be damaged by step transitions in the different layers during the mating operation. This reduces the likelihood of leaks occurring when the pin is mated with the inner surface of the plug socket contact. Applying a machining operation to all surfaces after they have been formed, i.e. to the insulating layer, to the semi-conductive layer and to the metal ensures concentricity and correct transitions between the different surfaces.

Figure 12A:
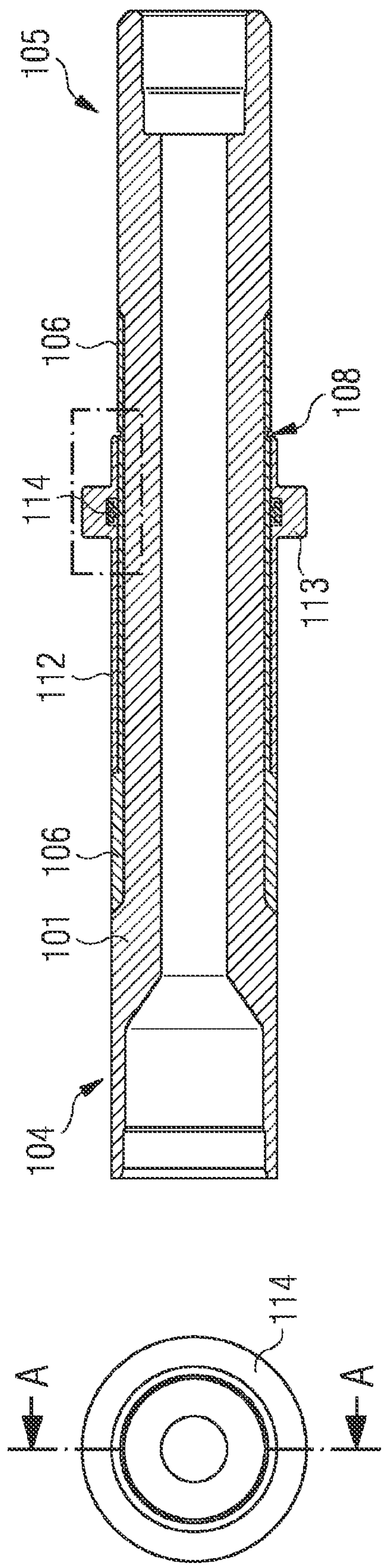
FIGS. 12*a* to 12*c* illustrate more detail of the embodiment of FIG. 11.
Figure 12B:
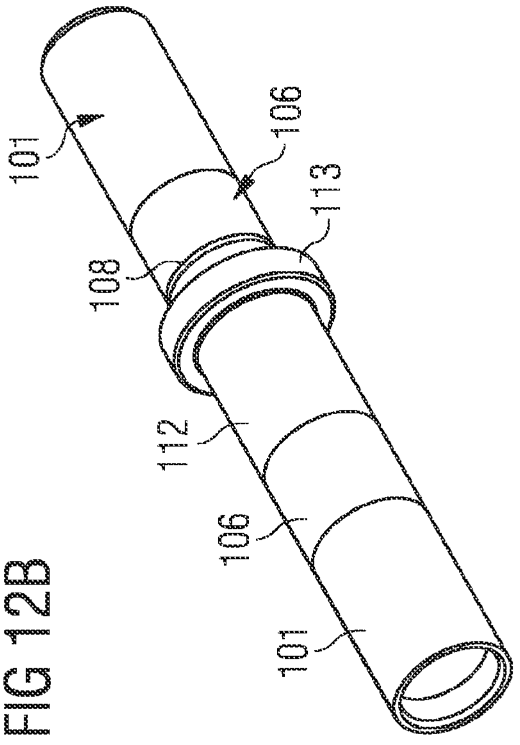
Figure 12C:
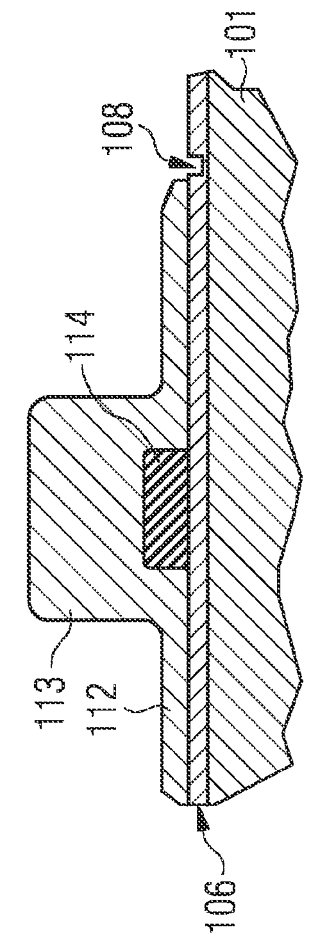

The pin 100 may be formed with a continuous section on which the metal layer 112, 113 covers part of the semi-conductive layer 106, substantially as described above, or it may be formed with discrete semi-conductive layers 106 separated from one another by a region of the insulating layer, so that the metal layer is compression fitted directly to the insulator along part of the length and to the semi-conductive layers only in the discrete sections. FIGS. 12*a* to 12*c* illustrate the first example in more detail, with the partially conducting layer 106 being continuous. FIGS. 13*a* to 13*e* illustrate the second example in more detail, with the partially conducting layer having more than one discrete section 118, 116, 119, 120 separated from one another.

Fig. 12*a* shows an example of a pin according to the invention. In this example, a conductor 109 has a cross section at the ends 110, 111 which is greater than the cross section of a central portion 109 to provide internal end stops to stop the components that are fed in from going too far. However, a straight bore of uniform cross sections, such as shown in FIG. 14*a* may be used instead, with external end stops on the conductor. At the pin front end 104, the conductor cross section is greater than at the pin rear end 105, but the central portion 109 of the conductor has a cross section less than the cross section of the conductor rear end 105. The insulating layer 101 has been formed by machining from extruded bar and the conductor rod assembled into the insulation sleeve, as described with respect to FIGS. 7 to 11. Thus, a part of the central portion 109 of the conductor has layers of insulation 101 and semi-conductive material 106 outside the conductor; a part of the central portion, additionally has an outer metal layer 112; and a part of the central portion of the conductor additionally has a seal 114 and a metal layer 113 radially outward of the central portion 109. This can be seen from another perspective in FIG. 12*b*. Detail of the section with the seal 114 is shown in FIG. 12*c*, where the layers of insulator 101, partially conducting layer 106, seal 114 and metal layer 112, 113 are clearly indicated. The presence of the seal 114 causes the metal layer 113 at that point to protrude radially at a greater distance from the conductor 109 than the insulating layer 101 at the front end 104. The groove 108 for the c-clip can be seen clearly in FIG. 12*c*.

Figure 13A:
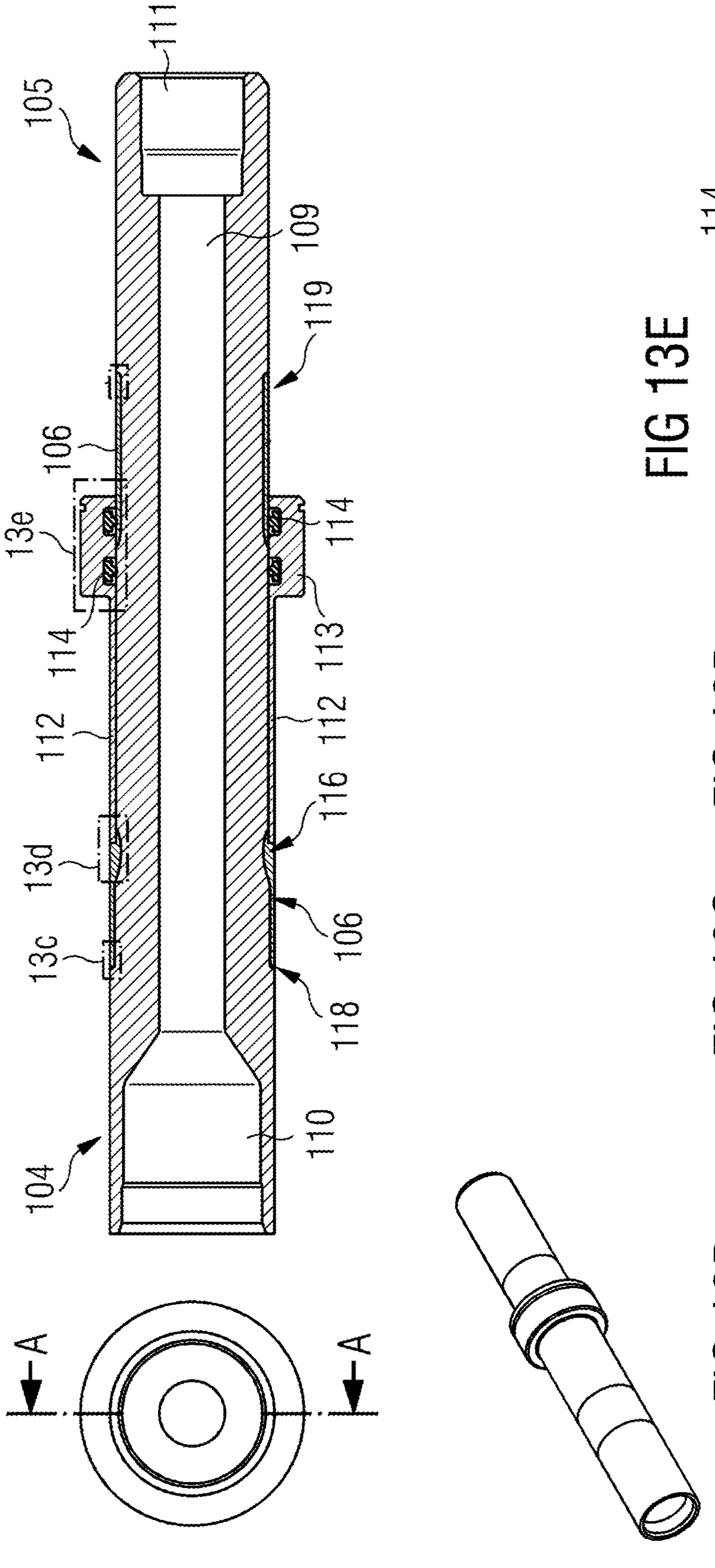
FIGS. 13*a* to 13*e* illustrate more detail of an alternative to the embodiment of FIG. 11.
Figure 13B:
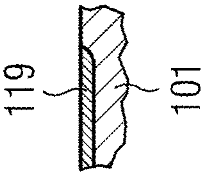
Figure 13C:
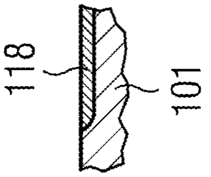
Figure 13D:
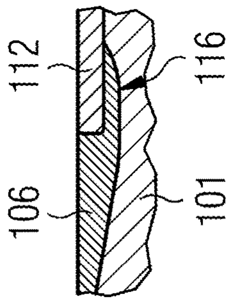

An alternative embodiment may be used to reduce the material costs and eliminate a potential leak path between the insulative layer and the semi-conductive layer by sealing the metal sleeve directly to the insulative material. This may be achieved by only coating the insulator 101 with a semi-conductive layer 106 at the locations where this is most beneficial. The process is similar to that in FIGS. 7 to 11, but also includes steps of defining a limit for each discrete area 118, 116, 120, 119 of the semi-conductive layer, so that no more carbon filled PEEK has to be used than absolutely necessary. FIG. 13*a* shows the overall receptacle pin arrangement, but two shoulders (shown in FIG 13*c* and FIG. 13*d*) are formed, in series in the insulating material 101. At the first shoulder of the insulator, shown in FIG. 13*c*, the layer of partially conducting material 118 that has been applied is thinner than at the second shoulder 106, shown in FIG. 13*d*. FIG. 13*d* shows a step at the shoulder formed in the insulating material at the point where the metal 112 joins to the semi-conductive material 106, 116, so that the transition between the metal the insulating layer is bridged by the semi-conductive layer.

Figure 13E:
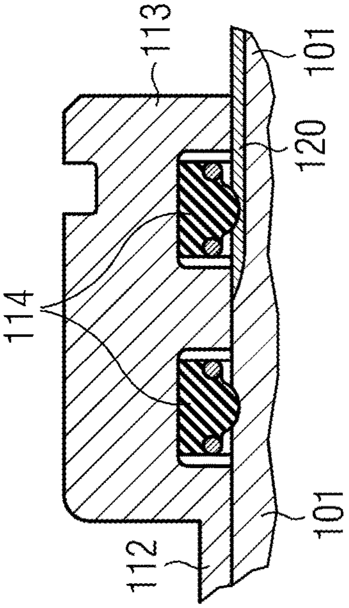

In FIG. 13*e*, two optional additions are shown in the form of polymeric or metal seals, such as O-ring or spring seals. Preferably, the seal is formed on the semi-conductive material 120, to eliminate the electric field from the groove, although it could be formed directly on the insulating layer 101 if there is a risk of a leak path via the semi-conductive layer.

A further embodiment of the invention is illustrated in FIGS. 14*a* to 14*c*. In this example, the conductor 109 has a uniform profile, rather than the profiled shoulders provided at each end of the conductor in the examples of FIGS. 9 to 11, 12*a* and 13*a*. With a uniform profile of this type, an alternative mechanism (not shown) is required to hold the conductor in place once it has been assembled into the insulation sleeve, such as by means of external end stops. The inner surface of the insulation sleeve may be coated with a metallic lining (not shown) before the conductor is inserted. The metal sleeve 112 is then applied by compression fitting to the outer surface of the insulation sleeve 101, along at least part of its length. The insulation sleeve may have been machined on its outer surface, along part of its length, in order to form a step 121 in the outer surface of the insulation sleeve. The depth of the step is typically equal to the thickness of the metal layer 112 after application, so that there is continuity between the outer surface of the insulation sleeve at one end and the outer surface of the metal layer. At the other end, the metal sleeve transitions 122 down to the surface of the insulation sleeve. As with the other examples, a seal (not shown) may be provided at a discrete location on the outside of the insulator and the metal sleeve shape is modified at this location accordingly. The ring so formed is able to act as a stop to prevent the pin from moving further.

Figure 15:
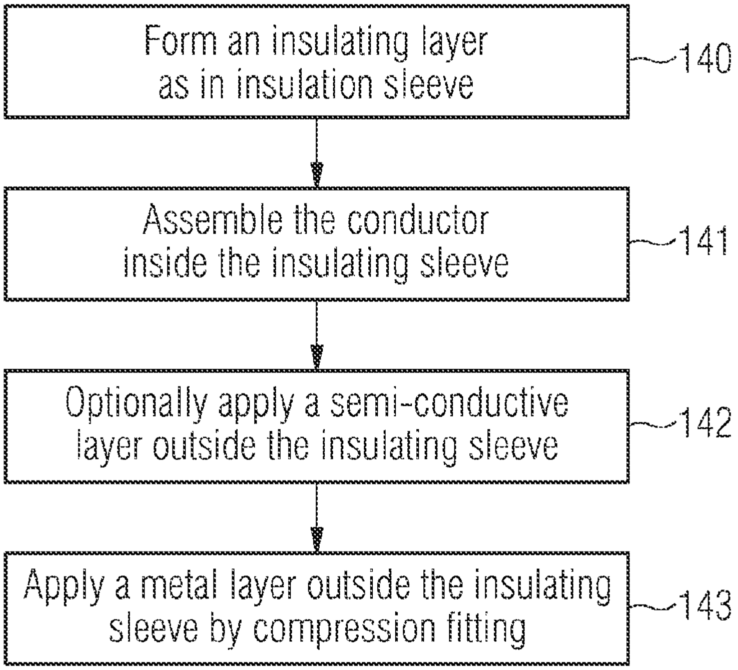

The method of assembly of the present invention is illustrated in the flow diagram of FIG. 15. As a first step, the insulating layer 101 is formed 140 into an insulation sleeve and optionally, coated with an inner conducting layer. A conductor is then inserted 141 into the insulation sleeve 101. Optionally, an at least partially conducting layer, or semi-conductive layer 118 is applied 142 to at least part of the outer surface of the insulation sleeve 101. A metal layer is then applied to the insulating layer 101 and, if provided, the semi-conductive layer 118 by compression fitting, as described above. The compression fitting typically comprises providing compression at an interface between two layers resulting in intimate contact between the two layers, the external dimension of one layer slightly exceeding the internal dimension of the other layer into which it has to fit, or having the same nominal diameter for the two layers.

The intimate overmoulding of the metal layer by shrink fitting to the insulator semi-conductive provides an effective barrier to seawater. Although metal layers, such as titanium have been used as a coating, they have traditionally be applied by spraying or layering directly to the electrically insulating PEEK sleeve, or glued to the electrically Insulating PEEK sleeve. Both glue or coating have the potential to give inconsistent application which increases the risk of porosity or degradation of the sealing performance. The method of the present invention uses fabricated components that are easy to verify by both surface finish and dimensions. The machined surfaces of the conductive PEEK and metal sleeve formed during assembly ensure good sealing capabilities of the finished component. Injection molding, shrink-fitting and seals produce effective sealing of the connector surfaces when mated. Thus, costs can be reduced in manufacture. Reliance on specialist coatings and sub-processes is avoided.

The conductive polymeric sleeve contains the electrical field within the insulative PEEK and also provides electrical stress control end to end or partially under the end portions of the metal sleeve. It is attached through intimate contact along its inside diameter which is achieved by injection moulding as per standard practice on other connector pins. The metal housing acts as the primary barrier to seawater (during operation) and also provides mechanical strength and distributes mechanical load via its unique assembly method. This is particularly beneficial where the pin may be subject to hydrostatic pressure resulting in axial loading of the pin. The compression fit of the metal sleeve generates sufficient radial loading onto the insulation that such axial forces can be resisted. Shrink fitting the metal layer has particular advantages, but other assembly methods may be used, such as bonding as described with respect to FIG. 3 above.

It should be noted that the term "comprising " does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by preferred embodiments, the invention is not limited by the examples disclosed, and other variations be derived therefrom by a person skilled in the art without departing from the scope of the invention.

The invention claimed is:

1. A method of assembling a component of a subsea connector, the component comprising a conductor, an electrically insulating layer and an at least partially electrically conductive layer; the method comprising:

applying a semi-conductive layer to an exterior surface of the conductor by casting, moulding, compression fitting, or additive manufacturing techniques;

providing the electrically insulating layer radially outward of the conductor and the semi-conductive layer;

machining a surface of the electrically insulating layer while the electrically insulating layer is provided radially outward of the conductor and the semi-conductive layer to form a second predetermined profile; and applying the at least partially electrically conductive layer onto the electrically insulating layer by casting, moulding, compression fitting, or additive manufacturing techniques.

2. The method according to claim 1, wherein the step of providing the electrically insulating layer comprises applying the electrically insulating layer to the conductor by casting, moulding, compression fitting, or additive manufacturing techniques, or by forming the electrically insulating layer as an insulation sleeve and assembling the conductor into the insulation sleeve.

3. The method according to claim 1, wherein the method further comprises, before applying the electrically insulating layer, machining the exterior surface of the conductor to form a first predetermined profile.

4. The method according to claim 1, wherein the method further comprises machining the at least partially electrically conductive layer to a third predetermined profile while the at least partially electrically conductive layer is applied to the electrically insulating layer.

5. The method according to claim 4, wherein the machining of the at least partially electrically conductive layer includes machining removing specific areas of the at least partially electrically conductive layer to expose the electrically insulating layer again.

6. The method according to claim 1, wherein the casting or moulding of the at least partially electrically conductive layer is carried out under a pressure that is greater than atmospheric pressure.

7. The method according to claim 1, the method further comprising:

applying a metal layer to the at least partially electrically conductive layer on a surface of the at least partially electrically conductive layer remote from the conductor, or applying a metal layer to a surface of the electrically insulating layer remote from the conductor.

8. The method according to claim 7, wherein the metal layer is located coaxial with, and radially outwardly of, the conductor and may be arranged to cover only part of the at least partially electrically conductive layer.

9. The method according to claim 7, wherein the at least partially electrically conductive layer comprises a semi-conductive layer, applied to one or more discrete regions of the electrically insulating layer, or applied over substantially all of the electrically insulating layer around the conductor.

10. The method according to claim 1, wherein the at least partially electrically conductive layer comprises a metal layer, suitable for subsea applications.

11. The method according to claim 1, wherein the at least partially electrically conductive layer is applied to an entirety of a radially outer surface of the electrically insulating layer.

12. The method according to claim 1, wherein the method further comprises creating a desired final profile by:

subsequently machining the electrically insulating layer a second time while the electrically insulating layer is provided radially outward of the conductor and the semi-conductive layer; and machining the at least partially electrically conductive layer while the at least partially electrically conductive layer is applied to the electrically insulating layer.

13. A component of a subsea connector, the component comprising:

a conductor, an electrically insulating layer comprising a radially outer surface formed at least partially by a machine cut and a radially inner surface formed by another forming process, an electrically semi-conductive layer fixedly attached to the conductor and positioned between the conductor and the electrically insulating layer, and a printed, cast, compression fitted, or moulded at least partially electrically conductive layer applied to the electrically insulating layer.

14. The component according to claim 13, wherein the at least partially electrically conductive layer comprises an electrically conductive semi-crystalline thermoplastic; an electrically conductive polymer, an electrically conductive rubber, a metal alloy, or an electrically conductive epoxy.

15. The component according to claim 13, wherein the at least partially electrically conductive layer comprises one of a compound of polyaryletherketone, with carbon; or room temperature vulcanisable rubber with a carbon additive, or nickel, or a compound of polyolefin with carbon.

16. The component according to claim 15, wherein the compound comprises polyetheretherketone with carbon, or polypropelene with carbon.

17. The component according to claim 13, wherein the electrically insulating layer comprises a polymer or thermoplastic.

18. The component according to claim 13, wherein the electrically semi-conductive layer comprises a polymer or thermoplastic to which a weakly electrically conducting additive has been applied.

19. The component according to claim 18, wherein the electrically semi-conductive layer comprises an electrically conductive semi-crystalline thermoplastic; an electrically conductive polymer, an electrically conductive rubber, or an electrically conductive epoxy; or room temperature vulcanisable rubber in a compound with carbon, or nickel; or polyolefin in a compound with carbon.

20. The method according to claim 10, wherein the metal layer comprises a highly corrosion resistant metal alloy, suitable for subsea applications, comprising a stainless steel, stainless nickel alloy, titanium, or titanium vanadium alloy.

21. The component according to claim 18, wherein the electrically semi-conductive layer comprises a compound of polyaryletherketone with carbon, or polyetheretherketone with carbon.

* * * * *